United States Patent
Dong et al.

(10) Patent No.: US 9,963,376 B2
(45) Date of Patent: May 8, 2018

(54) METHOD FOR CUTTING SUBSTRATE BY LASER AND LASER CUTTING DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Dai Dong, Beijing (CN); Yang Huang, Beijing (CN); Sheng Tao, Beijing (CN); Bingbing Chu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 24 days.

(21) Appl. No.: 14/770,581

(22) PCT Filed: May 19, 2015

(86) PCT No.: PCT/CN2015/079307
§ 371 (c)(1),
(2) Date: Aug. 26, 2015

(87) PCT Pub. No.: WO2016/050077
PCT Pub. Date: Apr. 7, 2016

(65) Prior Publication Data
US 2016/0362325 A1 Dec. 15, 2016

(30) Foreign Application Priority Data
Sep. 29, 2014 (CN) .......................... 2014 1 0515814

(51) Int. Cl.
C03B 33/08 (2006.01)
B23K 26/364 (2014.01)
(Continued)

(52) U.S. Cl.
CPC .......... *C03B 33/082* (2013.01); *B23K 26/364* (2015.10); *B23K 26/402* (2013.01);
(Continued)

(58) Field of Classification Search
CPC ... C03B 33/04; C03B 33/082; C03B 33/0222; C03B 33/037; B23K 26/364; B23K 26/402; B23K 2203/54
See application file for complete search history.

(56) References Cited

U.S. PATENT DOCUMENTS 4,467,168 A 8/1984 Morgan et al.
2003/0148057 A1 8/2003 Dietz et al.
(Continued)

FOREIGN PATENT DOCUMENTS

CN 1420849 A 5/2003
CN 1444082 A 9/2003
(Continued)

OTHER PUBLICATIONS

Machine translation of TW201345856, Ueno, Tsutomu; Method of Cutting Glasses and Cutting Apparatus; Nov. 16, 2013.*
(Continued)

*Primary Examiner* — Queenie S Dehghan
(74) *Attorney, Agent, or Firm* — Ladas & Parry LLP (57) ABSTRACT

A method for cutting a substrate by laser and a laser cutting device are disclosed. The method includes the following steps: engraving a plurality of intercrossed first parallel lines and second parallel lines on a substrate, in which regions for engraving a shape of sub-substrates are encircled between the first parallel lines and the second parallel lines; shaped lines are disposed in the regions; auxiliary split lines are engraved on an outside of the shaped lines; and a minimum distance from end portions of the auxiliary split lines towards the shaped lines to the shaped lines falls within the
(Continued)

first default threshold. The method adopts the arrangement of the parallel lines and the auxiliary split lines to help splitting the substrate, and can increase stress rupture points in the process of cutting the substrate, avoid the phenomenon of rupture of the glass substrate in the cutting process, and effectively improve the yield of substrate cutting.

13 Claims, 4 Drawing Sheets (51) Int. Cl.
    *B23K 26/402* (2014.01)
    *C03B 33/02* (2006.01)
    *C03B 33/037* (2006.01)
    *C03B 33/04* (2006.01)
    *B23K 103/00* (2006.01)

(52) U.S. Cl.
    CPC ........ *C03B 33/0222* (2013.01); *C03B 33/037* (2013.01); *C03B 33/04* (2013.01); *B23K 2203/50* (2015.10); *B23K 2203/54* (2015.10)

(56) References Cited

U.S. PATENT DOCUMENTS

| | | |
|---|---|---|
| 2003/0168055 A1 | 9/2003 | Chae |
| 2004/0144231 A1 | 7/2004 | Hanada |
| 2006/0266783 A1 | 11/2006 | Hoetzel |
| 2016/0280580 A1* | 9/2016 | Bohme ................ B23K 26/38 |
| 2016/0311717 A1* | 10/2016 | Nieber .............. B23K 26/0087 |

FOREIGN PATENT DOCUMENTS

| | | |
|---|---|---|
| CN | 1282617 C | 11/2006 |
| CN | 1868943 A | 11/2006 |
| CN | 102765876 A | 11/2012 |
| CN | 103030264 A | 4/2013 |
| CN | 103771694 A | 5/2014 |
| CN | 104310779 A | 1/2015 |
| TW | 201345856 A | 11/2013 |

OTHER PUBLICATIONS

Second Chinese Office Action dated Dec. 12, 2016; Appln. No. 201410515814.9.

International Search Report and Written Opinion both dated Jun. 29, 2015; PCT/CN2015/079307.

First Chinese Office Action dated Apr. 25, 2016; Appln. No. 201410515814.9.

The Third Chinese Office Action dated Jul. 31, 2017; Appln. No. 201410515814.9.

The Fourth Chinese Office Action dated Mar. 2, 2018; Appln. No. 201410515814.9.

* cited by examiner

METHOD FOR CUTTING SUBSTRATE BY LASER AND LASER CUTTING DEVICE

TECHNICAL FIELD

Embodiments of the present invention relate to a method for cutting a substrate by laser and a laser cutting device.

BACKGROUND

Conventional glass cutting devices mainly include wheel cutting and $CO_2$ laser cutting devices. The wheel splitting methods mainly include natural splitting, steam type, hot air type and pressure type. The splitting means for $CO_2$ laser cutting method mainly includes cold-thermal shock. The wheel cutting and $CO_2$ laser cutting methods have single cutting paths, only include horizontal and vertical linear cutting paths, can only cut substrates with relatively simple shape, cannot perform cutting for irregular shape, and have a fixed cutting sequence.

SUMMARY

Embodiments of the present invention provide a method for cutting a substrate by laser and a laser cutting device, which are used for increasing the stress rupture points in the process of cutting the substrate, improving the effect of substrate cutting, and reducing the phenomenon of substrate rupture.

An embodiment of the present invention provides a method for cutting a substrate by laser. The method comprises the following steps: engraving a plurality of first parallel lines along a first direction, a plurality of second parallel lines along a second direction, and shaped lines for sub-substrates on a substrate, in which the second direction is perpendicular to the first direction; the plurality of second parallel lines are intercrossed with the plurality of first parallel lines; regions for engraving a shape of the sub-substrates are encircled between the intercrossed first parallel lines and second parallel lines; and the shaped lines are disposed in the regions for engraving the shape of the sub-substrates; and engraving auxiliary split lines on an outside of the shaped lines and in the regions for engraving the shape of the sub-substrates, in which the minimum distance from end portions, towards the shaped lines, of the auxiliary split lines to the shaped lines falls within the first default threshold.

Another embodiment of the present invention further provides a laser cutting device. The device comprises: a laser knife and a controller connected with the laser knife; a route for controlling the laser knife to engrave first parallel lines, second parallel lines, shaped lines and auxiliary split lines on the substrate is set in the controller; the first parallel lines are extended along a first direction; the second parallel lines are extended along a second direction; the second direction is perpendicular to the first direction; the second parallel lines are intercrossed with the first parallel lines; regions for engraving a shape of sub-substrates are encircled between the intercrossed first parallel lines and second parallel lines; the shaped lines are disposed in the regions for engraving the shape of the sub-substrates; the auxiliary split lines are engraved on an outside of the shaped lines and in the regions for engraving the shape of the sub-substrates; a minimum distance from end portions, towards the shaped lines, of the auxiliary split lines to the shaped lines falls within the first default threshold; and the first parallel lines, the second parallel lines, the shaped lines and the auxiliary split lines are engraved on the substrate by the laser knife according to the set route.

BRIEF DESCRIPTION OF THE DRAWINGS

Simple description will be given below to the accompanying drawings of the embodiments to provide a more clear understanding of the technical proposals of the embodiments of the present invention. Obviously, the drawings described below only involve some embodiments of the present invention but are not intended to limit the present invention.

Reference numerals of the accompanying drawings:
10—Substrate; 20—First Parallel Line; 30—Second Parallel Line; 40—Auxiliary Split Line; 50—Shaped Line; 23—Region for Engraving the Shape of Sub-substrate; 60—Outside of Shaped Line.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. Obviously, the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

In order to increase the stress rupture points in the process of cutting the substrate, improve the effect of substrate cutting, and alleviate the phenomenon of substrate rupture, the embodiments of the present invention provide a method for cutting a substrate by laser and a laser cutting device. In the technical proposal of the embodiment of the present invention, the effect of profiled cutting (cutting for irregular shape) in the process of cutting the substrate by laser can be improved by the additionally arranged auxiliary split lines, and hence the effect of substrate cutting and the phenomenon of substrate rupture can be improved. For more clear understanding of the objectives, technical proposals and advantages of the present invention, further description will be given below to the present invention with reference to non-limitative examples.

An embodiment of the present invention provides a method for cutting a substrate by laser. The method comprises the following steps:

engraving a plurality of first parallel lines along a first direction, a plurality of second parallel lines along a second direction, and shaped lines for sub-substrates on the substrate, in which the second direction is perpendicular to the first direction; the plurality of second parallel lines are intercrossed with the plurality of first parallel lines; regions for engraving the shape of sub-substrates are encircled between the intercrossed first parallel lines and second parallel lines; and the shaped lines are disposed in the regions for engraving the shape of the sub-substrates; and engraving auxiliary split lines on the outside of the shaped lines and in the regions for engraving the shape of the sub-substrates, in which the minimum distance from end portions, towards the shaped lines, of the auxiliary split lines to the shaped lines falls within the first default threshold.

In the embodiment, the first parallel lines, the second parallel lines and the auxiliary split lines are arranged to help splitting the substrate in cutting, so that the stress rupture points in the process of cutting the substrate can be increased. Therefore, the process of cutting the substrate become convenient; the phenomenon of rupture of the glass substrate in the cutting process can be avoided; the yield of substrate cutting can be effectively improved; and the waste of materials can be avoided. Meanwhile, the cutting method can have reasonable and ingenious cutting paths, and the substrates in cutting can be completely separated and be automatically taken out.

For the convenient understanding of the embodiment of the present invention, detailed description will be given below with reference to FIGS. 1 to 6 and the preferred embodiments.

An embodiment of the present invention provides a method for cutting a substrate by laser. The method comprises the following steps.

Figure 1:
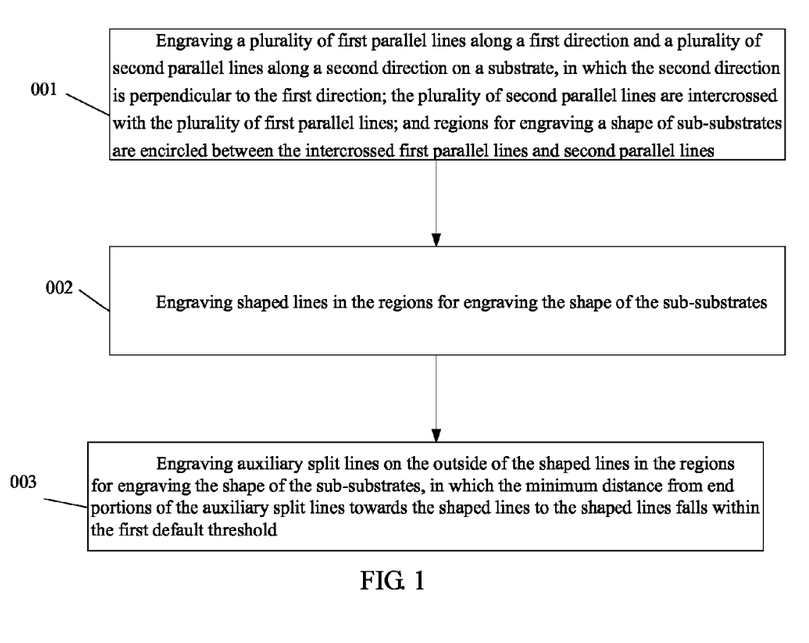
FIG. 1 is a flowchart of a method for cutting a substrate by laser, provided by an embodiment of the present invention.

S001: engraving a plurality of first parallel lines along a first direction and a plurality of second parallel lines along a second direction on a substrate, in which the second direction is perpendicular to the first direction; the plurality of second parallel lines are intercrossed with the plurality of first parallel lines; and regions for engraving the shape of sub-substrates are encircled between the intercrossed first parallel lines and second parallel lines.

Figure 2:
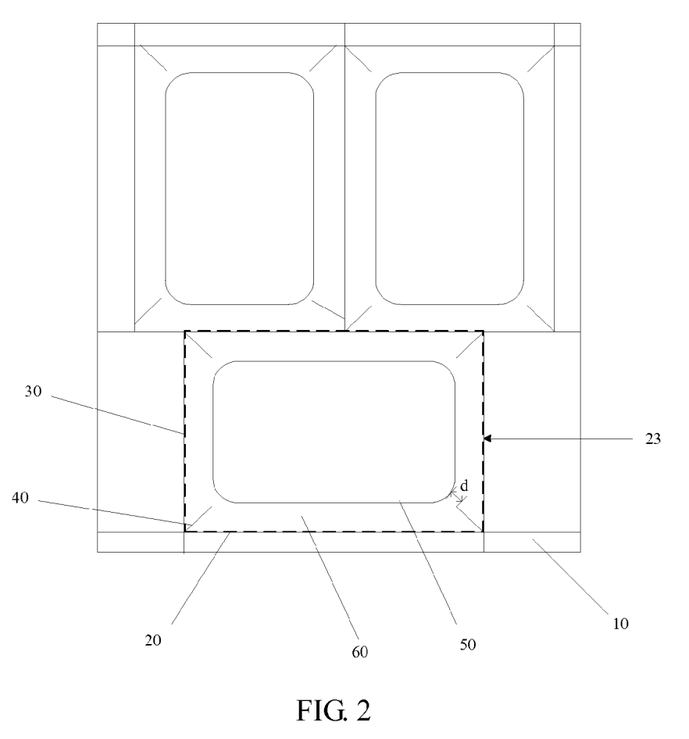
FIG. 2 is a schematic diagram of one kind of engraved lines on the substrate in the method for cutting the substrate by laser, provided by an embodiment of the present invention.

For instance, a plurality of first parallel lines 20 and a plurality of second parallel lines 30 are engraved on a substrate 10, in which the first direction is the horizontal direction and the second direction is the vertical direction, so rectangular blocks are encircled by the plurality of first parallel lines 20 and the plurality of second parallel lines 30; and in the cutting process, the first parallel lines 20 and the second parallel lines 30 can be engraved according to the size of the glass substrate 10. As illustrated in FIG. 2, three rectangular blocks may be encircled by the second parallel lines 30 arranged in a staggered form according to the size of the substrate 10, so that the material of the substrate 10 can be maximally utilized. Moreover, a plurality of rectangular blocks distributed in arrays may also be formed. No limitation will be given to the embodiment here.

S002: engraving shaped lines 50 in the regions for engraving the shape of the sub-substrates.

Figure 5:
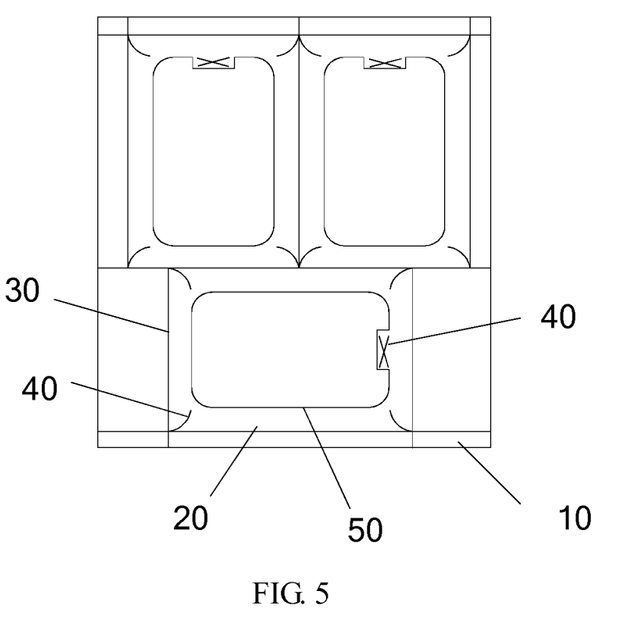
FIG. 5 is a schematic diagram of another kind of engraved lines on the substrate in the method for cutting the substrate by laser, provided by an embodiment of the present invention.
Figure 6:
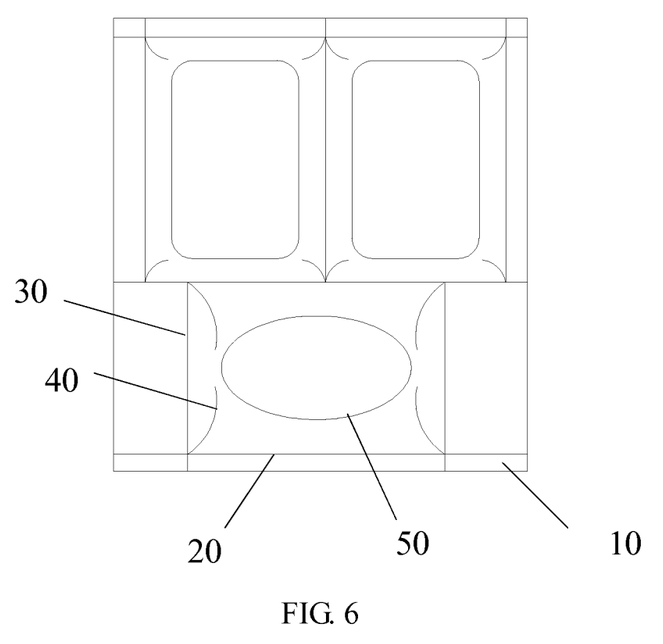
FIG. 6 is a schematic diagram of another kind of engraved lines on the substrate in the method for cutting the substrate by laser, provided by an embodiment of the present invention.

For instance, shaped lines 50 are engraved on the substrate 10, and the shaped lines 50 are formed in different shapes according to different shapes of the sub-substrates. As illustrated in FIGS. 2, 5 and 6, the shaped line 50 in FIG. 2 is a rectangular line provided with rounded angles; the shaped line in FIG. 5 is provided with a recessed notch on the basis of the shaped line in FIG. 2; and the shaped line in FIG. 6 is an elliptical line. It should be noted that the shape of the shaped lines is not limited thereto and the shaped lines may be engraved according to any actual demands.

In addition, in the engraving process, the minimum distance from the first parallel line 20 to a line segment of the shaped line 50 close to the side of the first parallel line falls within the second default threshold; and the distance from the second parallel line 30 to a line segment of the shaped line 50 close to the side of the second parallel line falls within the second default threshold. For instance, the second default threshold is from 0.5 mm to 1.5 mm, for example: 0.5 mm, 0.7 mm, 0.9 mm, 1.1 mm, 1.2 mm, 1.5 mm or any value between 0.5 mm and 1.5 mm. For instance, the distance from the first parallel line 20 to the line segment of the shaped line 50 close to the side of the first parallel line is 0.5 mm; and the distance from the second parallel line 30 to the line segment of the shaped line 50 close to the side of the second parallel line is 0.5 mm.

S003: engraving auxiliary split lines 40 on the outside 60 of the shaped lines 50 in the regions for engraving the shape of the sub-substrates, in which the minimum distance from end portions of the auxiliary split lines 40 towards the shaped lines 50 to the shaped lines 50 falls within the first default threshold.

For instance, different auxiliary split lines 40 are engraved according to different shaped lines 50 to help splitting the substrate 10. As illustrated in FIG. 2, the shaped lines 50 are in a rectangular; angles of the rectangular are rounded angles; each rounded angle corresponds to an intersection between a first parallel line 20 and a second parallel line 30. An auxiliary split line 40 is a straight line or a curved line extended from the intersection between each first parallel line 20 and each second parallel line 30 along the direction to the rounded angle corresponding to the auxiliary split line 40; or the auxiliary split line 40 is a fold line, of which both ends are respectively connected with the first parallel line 20 and the second parallel line 30 adjacent to each other, and an end portion of the auxiliary split line 40 towards the shaped line 50 is the corner of the fold line. For instance, the auxiliary split lines 40 may be engraved at the rounded angles to help splitting the shape at the rounded angles and avoiding the phenomenon of rupture of the shaped lines 50 at the rounded angles in the cutting process. Different shapes of the auxiliary split lines 40 may be selected according to actual conditions. Moreover, the auxiliary split lines 40 are not limited to the above description. For instance, the auxiliary split line 40 may be arranged so that one end is disposed at the intersection between the first parallel line 20 and the second parallel line 30. As illustrated in FIG. 2, the end may also be disposed on the first parallel line 20 or the second parallel line 30.

As for the shaped lines 50 as shown in FIG. 2, the auxiliary split lines 40 may include the following types:

As illustrated in FIG. 2, the auxiliary split line 40 is a straight line extended from the intersection between the first parallel line 20 and the second parallel line 30 along the direction to the rounded angle corresponding to the intersection, and the minimum distance from one end of the straight line close to the rounded angle to the rounded angle falls within the first default threshold. As illustrated in FIG. 2, the distance d as shown in FIG. 2 refers to the distance from one end of the straight line close to the rounded angle to the rounded angle. For instance, when the auxiliary split line 40 adopts the form of a straight line, the auxiliary split line 40 is an angle bisector of the included angle between the first parallel line 20 and the second parallel line 30 connected with the auxiliary split line 40. Thus, the engraving process is convenient.

Figure 3:
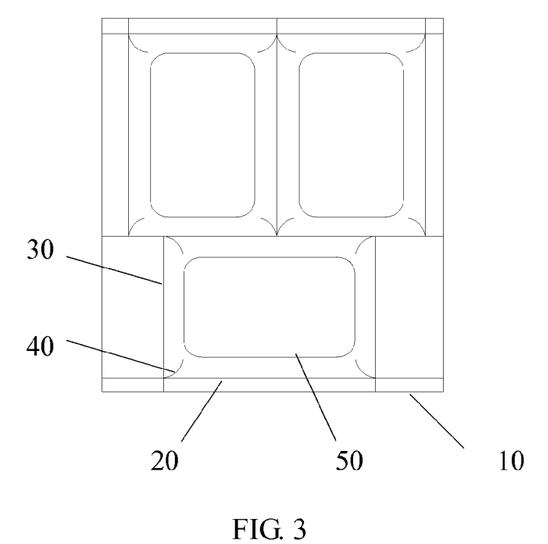
FIG. 3 is a schematic diagram of another kind of engraved lines on the substrate in the method for cutting the substrate by laser, provided by an embodiment of the present invention.

As illustrated in FIG. 3, the auxiliary split line 40 is a curved line extended from the intersection between the first parallel line 20 and the second parallel line 30 along the direction to the rounded angle corresponding to the intersection, and the minimum distance from one end of the curved line close to the rounded angle to the rounded angle falls within the first default threshold.

Figure 4:
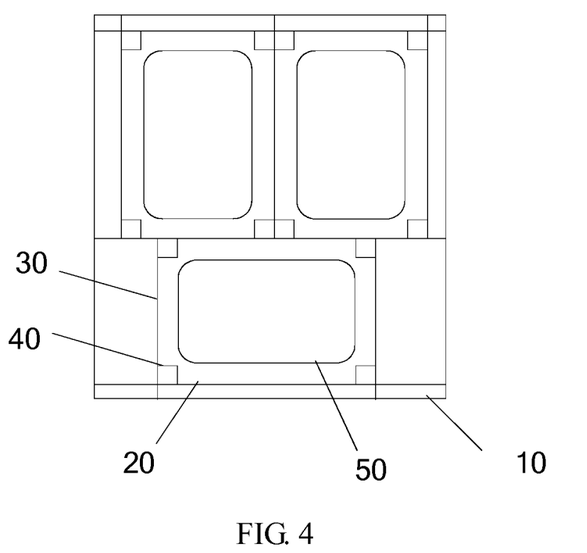
FIG. 4 is a schematic diagram of another kind of engraved lines on the substrate in the method for cutting the substrate by laser, provided by an embodiment of the present invention.

As illustrated in FIG. 4, the auxiliary split line 40 is a fold line, of which both ends are respectively connected with the first parallel line 20 and the second parallel line 30 adjacent to each other; an end portion of the auxiliary split line 40 towards the shaped line 50 is the corner of the fold line; and the minimum distance from the corner to the rounded angle corresponding to the corner falls within the first default threshold.

As for the shaped lines 50 as shown in FIG. 5, the auxiliary split lines 40 not only include the lines of any type as shown in FIGS. 2 to 4 but also include X-shaped lines in recessed bend lines; and the minimum distance from end portions of the X-shaped line to the shaped line 50 close to the X-shaped line shall fall within the first default threshold.

As for the shaped lines 50 as shown in FIG. 6, the shaped line 50 is an elliptical line; a major axis of the elliptical line is disposed on a center line of two second parallel lines 30 for forming the region for engraving the shape of the sub-substrate; and the auxiliary split line 40 is a curved line engraved from the intersection between each first parallel line 20 and each second parallel line 30 to the end of the major axis corresponding to the intersection. Moreover, the minimum distance from the curved line to corresponding shaped line 50 falls within the first default threshold. The major axis of the elliptical line may also be disposed on a center line of two first parallel lines 20 for forming the region for engraving the shape of the sub-substrate.

It can be seen from the above description that portions among the first parallel lines 20, the second parallel lines 30 and the shaped lines 50 can be divided by the arranged auxiliary split lines 40, so that different blocks can be conveniently formed on the substrate 10 in the cutting process and the phenomenon of rupture in the cutting process can be avoided. In order to guarantee that the spacing between the auxiliary split lines 40 and the shaped lines 50 can ensure that the substrate can be split with the auxiliary split lines 40, the first default threshold is, for instance, 50 μm to 150 μm, for example: 50 μm, 60 μm, 80 μm, 90 μm, 100 μm, 120 μm, 150 μm or any value between 50 μm and 150 μm. For instance, the minimum distance from an end portion of the auxiliary split line 40 towards the shaped line 50 to the shaped line 50 is 100 μm.

It should be understood that the preferred embodiments only illustrate the specific operating ways. Any technical proposal including the arrangement of the auxiliary split lines 40 to facilitating to cut the substrate 10 shall be contained in the content of the present invention. For instance, the sequence of the steps 001 and 002 in the engraving process may be determined according to actual demands. That is to say, as shown in the preferred embodiments, the first parallel lines 20 and the second parallel lines 30 may be engraved at first, and then the shaped lines 50 are engraved; or the shaped lines 50 may also be engraved at first, and then the first parallel lines 20 and the second parallel lines 30 are engraved. The principle of the embodiment is the same as the principle of the above preferred embodiment. No further description will be given here.

In the method for cutting the substrate by laser, provided by the embodiment of the present invention, the auxiliary split lines are arranged to help splitting the substrate. Therefore, the phenomenon of rupture of the glass substrate in the cutting process can be avoided; the yield of substrate cutting can be effectively improved; and the waste of materials can be avoided. Meanwhile, the cutting method has reasonable and ingenious cutting paths, and the substrates in cutting can be completely separated and be automatically taken out.

In the method for cutting the substrate by laser, provided by the embodiment of the present invention, in the process of engraving the lines, microcracks are generated on the substrate; after the lines are engraved, under the action of stress, the substrate can be split and the cutting process can be completed, and hence the sub-substrates with required shapes can be obtained. If the substrate cannot be split, laser cutting can be performed again, and the cutting process can be completed by utilization of the principle of expanding when heated and contracting when cooled.

An embodiment of the present invention further provides a laser cutting device. The device comprises: a laser knife and a controller connected with the laser knife.

The route for controlling the laser knife to engrave first parallel lines, second parallel lines, shaped lines and auxiliary split lines on a substrate is set in the controller; the minimum distance from end portions, towards the shaped lines, of the auxiliary split lines to the shaped lines falls within the first default threshold.

The first parallel lines, the second parallel lines, the shaped lines and the auxiliary split lines are engraved on the substrate by the laser knife according to the set route.

The setting of the route for controlling the laser knife to engrave the first parallel lines, the second parallel lines, the shaped lines and the auxiliary split lines on the substrate includes: controlling the laser knife to engrave the plurality of first parallel lines along a first direction, the plurality of second parallel lines extended along a second direction perpendicular to the first direction and intercrossed with the first parallel lines, and the shaped lines for sub-substrates on the substrate, in which regions for engraving the shape of the sub-substrates are encircled between the intercrossed first parallel lines and second parallel lines; the shaped lines are disposed in the regions for engraving the shape of the sub-substrates; the auxiliary split lines are engraved on the outside of the shaped lines and in the regions for engraving the shape of the sub-substrates; and the minimum distance from the end portions of the auxiliary split lines towards the shaped lines to the shaped lines falls within the first default threshold.

In the above embodiment, the controller is configured to set paths of the auxiliary split lines and control the laser knife to cut the auxiliary split lines to help splitting the substrate. Therefore, the phenomenon of rupture of the glass substrate in the cutting process can be avoided; the yield of substrate cutting can be effectively improved; and the waste of materials can be avoided. Meanwhile, the cutting method has reasonable and ingenious cutting paths, and the substrates in cutting can be completely separated and be automatically taken out.

Obviously, various modifications and deformations can be made to the present invention by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The application claims priority to the Chinese patent application No. 201410515814.9, filed on Sep. 29, 2014, the disclosure of which is incorporated herein by reference as part of the application.

The invention claimed is:

1. A method for cutting a substrate by laser, comprising following steps:

engraving a plurality of first parallel lines along a first direction, a plurality of second parallel lines along a second direction, and shaped lines for sub-substrates on a substrate, in which the second direction is perpendicular to the first direction; the plurality of second parallel lines are intercrossed with the plurality of first parallel lines; regions for engraving a shape of the sub-substrates are encircled between the intercrossed first parallel lines and second parallel lines; and the shaped lines are disposed in the regions for engraving the shape of the sub-substrates; and engraving auxiliary split lines on an outside of the shaped lines and in the regions for engraving the shape of the sub-substrates, in which a minimum distance from end portions, towards the shaped lines, of the auxiliary split lines to the shaped lines fails within a first default threshold, wherein the first default threshold is from 50 μm to 150 μm.

2. The method for cutting the substrate by laser according to claim 1, wherein the step of engraving the plurality of first parallel lines along the first direction, the plurality of second parallel lines along the second direction, and the shaped lines of the sub-substrates on the substrate, in which the second direction is perpendicular to the first direction; the second parallel lines are intercrossed with the first parallel lines; the regions for engraving the shape of the sub-substrates are encircled between the intercrossed first parallel lines and second parallel lines; and the shaped lines are disposed in the regions for engraving the shape of the sub-substrates, comprises:

engraving the plurality of first parallel lines along the first direction and the plurality of second parallel lines along the second direction on the substrate, in which the second direction is perpendicular to the first direction; the second parallel lines are intercrossed with the first parallel lines; and the regions for engraving the shape of the sub-substrates are encircled between the intercrossed first parallel lines and second parallel lines; and engraving the shaped lines of the sub-substrates in the regions for engraving the shape of the sub-substrates.

3. The method for cutting the substrate by laser according to claim 2, wherein a distance from the first parallel line to a line segment of the shaped line close to a side of the first parallel line falls within the second default threshold;

a distance from the second parallel line to a line segment of the shaped line close to a side of the second parallel line falls within the second default threshold; and the second default threshold is from 0.5 mm to 1.5 mm.

4. The method for cutting the substrate by laser according to claim 1, wherein each of the shaped line forms at least part of a rectangle; angles of the rectangle are rounded angles; each rounded angle corresponds to an intersection between one first parallel line and one second parallel line;

at least part of the auxiliary split lines is a straight line or a curved line extended from the intersection between each first parallel line and each second parallel line along a direction to the rounded angle correspond to the auxiliary split lines; or at least part of the auxiliary split lines is a fold line, of which both ends are respectively connected with the first parallel line and the second parallel line adjacent to each other, and an end portion of the auxiliary split lines towards the shaped line is a corner of the fold line.

5. The method for cutting the substrate by laser according to claim 4, wherein one end of the shaped line comprises a recessed bend line, the recessed bend line is located in a plane parallel to the substrate; and the auxiliary split lines include an X-shaped line formed in the recessed bend line.

6. The method for cutting the substrate by laser according to claim 5, wherein a distance from the first parallel line to a line segment of the shaped line close to a side of the first parallel line falls within the second default threshold;

a distance from the second parallel line to a line segment of the shaped line close to a side of the second parallel line falls within the second default threshold; and the second default threshold is from 0.5 mm to 1.5 mm.

7. The method for cutting the substrate by laser according to claim 4, wherein a distance from the first parallel line to a line segment of the shaped line close to a side of the first parallel line falls within the second default threshold;

a distance from the second parallel line to a line segment of the shaped line close to a side of the second parallel line falls within the second default threshold; and the second default threshold is from 0.5 mm to 1.5 mm.

8. The method for cutting the substrate by laser according to claim 1, wherein each auxiliary split line is an angle bisector of an included angle between the first parallel line and the second parallel line connected with this auxiliary split line.

9. The method for cutting the substrate by laser according to claim 8, wherein a distance from the first parallel line to a line segment of the shaped line close to a side of the first parallel line falls within the second default threshold;

a distance from the second parallel line to a line segment of the shaped line close to a side of the second parallel line fails within the second default threshold; and the second default threshold is from 0.5 mm to 1.5 mm.

10. The method for cutting the substrate by laser according to claim 1, wherein the shaped line is an elliptical line; a major axis of the elliptical line is disposed on a center line of two first parallel lines or two second parallel lines for forming the region for engraving the shape of the sub-substrate; and each auxiliary split line is a curved line engraved from the intersection between each first parallel line and each second parallel line to an end, corresponding to this auxiliary split line, of the major axis.

11. The method for cutting the substrate by laser according to claim 1, wherein a distance from the first parallel line to a line segment of the shaped line close to a side of the first parallel line falls within the second default threshold;

a distance from the second parallel line to a line segment of the shaped line close to a side of the second parallel line falls within the second default threshold; and the second default threshold is from 15 mm to 1.5 mm.

12. The method for cutting the substrate by laser according to claim 11, wherein the minimum distance from the first parallel line to the line segment of the shaped line close to one side of the first parallel line is 0.5 mm; and the minimum distance from the second parallel line to the line segment of the shaped line close to one side of the second parallel line is 0.5 mm.

13. The method for cutting the substrate by laser according to claim 1, wherein the first default threshold is 100 µm.

* * * * *